Figure 1:
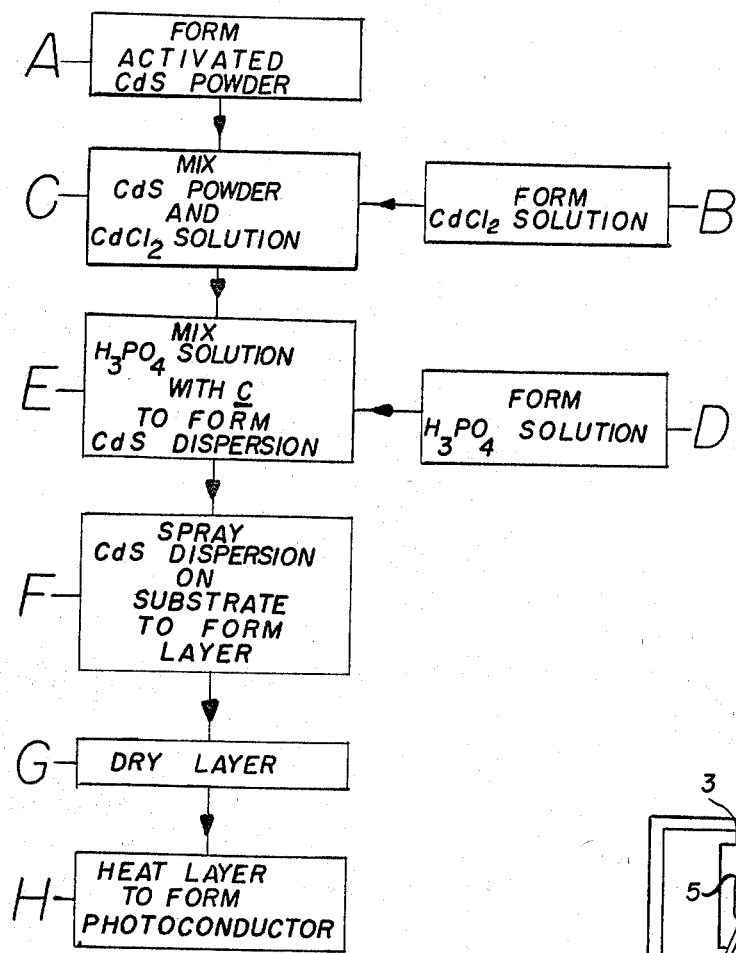

INVENTORS
JOHANNES G. VAN SANTEN
HENDRIK ESVELT
HENDRIK J.M. JOORMANN

BY Frank R. Trifari
AGENT 3,284,235
**METHOD OF MANUFACTURING PHOTO-
CONDUCTIVE LAYERS**
Johannes Gerrit van Santen, Hendrik Esvelt, and Hendrik Jacobus Maria Joormann, Emmasingel, Eindhoven, Netherlands, assignors to North American Philips Company, Inc., New York, N.Y., a corporation of Delaware
Filed Feb. 4, 1963, Ser. No. 255,837
Claims priority, application Netherlands, Feb. 14, 1962, 274,816
11 Claims. (Cl. 117—201)

The invention relates to a method of manufacturing a photoconductive layer employing cadmium sulphide, cadmium selenide or mixed crystals of said compounds, and to a photo-conductive layer manufactured by such a method. Such photo-conductive layers are used, for example, in photocells and image intensifiers. An example of a known method consists in that powdered activated cadmium sulphide together with a binder is applied to a support. The activated cadmium sulphide powder was obtained, for example, by sintering cadmium sulphide to which activators such as, for example, copper, silver and chlorine, had been added and subsequently grinding the sintered material to powder. Binders which have been suggested include fats, waxes, cellulose lacquer and vaporizable organic binders, such as vaporizable ketones, for example, acetone, to which waterglass may be added. The photo-sensitivity of the resulting layers, however, was comparatively low, which is due to a poorly conducting contact between the grains of the powder.

According to another known method, powdered cadmium sulphide, which was dispersed in a solution of cadmium chloride, cadmium bromide or cadmium iodide and to which activators in the form of salts may be added, was applied to a support and, after evaporating the solvent, heated so that the cadmium chloride is the first to melt and dissolves a small portion of the cadmium sulphide, after which the cadmium chloride evaporates with the deposition of cadmium sulphide activated by chlorine and any further activators which may have been added. Although the sensitivity can be slightly improved, the cells were particularly slow, that is to say, after illumination the resistance rose only slowly to the dark resistance. Further, in many cases the coherence of the grains was found to be unsatisfactory.

The present invention which relates especially to a method of manufacturing photo-conductive layers in which a powder consisting of cadmium sulphide, cadmium selenide or mixed crystals of said compounds and a solution of cadmium chloride, -bromide and/or -iodide are applied to a support, after which the solvent is evaporated and the assembly is heated, has for its object to improve this method. It was surprising to find that the use of oxidized phosphorus provided not only satisfactory coherence between the powder grains, but also a material decrease of the slowness and a high photo-sensitivity.

According to the invention, phosphorus in oxidized form was added to the solution. The phosphorus was preferably added in the pentavalent form, for example, in the form of phosphorus pentoxide or another compound which on heating leaves no other residue than oxidized phosphorus, for example, phosphoric acid or ammonium phosphate. The amount of the phosphorus added in oxidized form may be comparatively small and preferably is at least .05 atomic percent and at most 0.5 atomic percent of the amount of cadmium in the powder. The amount of cadmium halide used preferably is at least 0.7 mol. percent and at most 7 mol. percent of the amount of cadmium chalcogenide in the powder.

Heating after evaporation of the solvent is preferably effected in an oxygen atmosphere, for example, in air, and preferably at a temperature of at least 450° C. and at most 700° C. The duration of the heating treatment is not critical and may be longer or shorter as the heating temperature is low or high. It is preferably long enough for the cadmium halide to be substantially evaporated.

The grain size of the powder used preferably is at most $100\mu$. For many uses, for example, for photocells having a small electrode spacing, generally a smaller grain size is used, preferably of at most $50\mu$.

The powder used is preferably activated previously, for example, by sintering in the presence of activators. The activators used preferably are gallium and copper in substantially equal atomic amounts. Other suitable activators are silver, which may for instance partly or entirely be substituted for copper, and indium, which may for instance partly or entirely be substituted for gallium. The amount of each of these activators preferably is at least $5 \times 10^{-3}$ and at most $5 \times 10^{-2}$ atomic percent of the cadmium in the powder.

By the use of the method in accordance with the invention not only layers of small surface area, which are generally used in photo-cells, but also highly photosensitive layers of comparatively large size, for example, of several square decimetres, can be made. Such layers are suited, for example, for use in image intensifiers.

Figure 2:
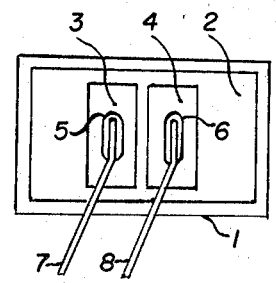

In order that the invention may readily be carried out, an example thereof will now be described with reference to the accompanying diagrammatic drawings, in which FIG. 1 is a block diagram of the sequence of operations and stages of the manufacture of a photo-sensitive layer on a support, and FIG. 2 is a plan view of a photocell provided with such a photo-sensitive layer.

The manufacture of a photo-sensitive layer employing cadmium sulphide will now be described, by way of example, with reference to FIG. 1.

The initial powder, A, consists of cadmium sulphide containing as activators $2 \times 10^{-4}$ gram-atom of copper and $2 \times 10^{-4}$ gram-atom of gallium per gram-molecule of cadmium sulphide (FIG. 1), for instance the amount of each of these activators, copper and gallium, being $5 \times 10^{-2}$ atomic percent of the cadmium in the cadmium sulphide. This powder is obtained, for example, by sintering to compactness powdered pure cadmium sulphide together with the required amounts of copper nitrate and gallium nitrate at a temperature of, for example, 900° C. in a hydrogen sulphide atmosphere for 2 hours, after which the sintered product is ground and the resulting powder is strained to obtain a maximum particle size of $37\mu$ (400-mesh). 12 grams of a previously prepared solution of 25% by weight of cadmium chloride in 96% alcohol, B, were added to 500 grams of said powder. Further, enough alcohol was added to provide after mixing a sprayable mixture C. 1.8 cc. of a 25% solution of orthophosphoric acid ($H_3PO_4$) in water, D, was added to said mixture and the assembly was again mixed to produce a mixture E. Immediately thereupon, that is to say, about 2 minutes after the addition of the phosphoric acid, the mixture E is sprayed as a thin layer on a support. If the mixture E would be used a long time after its manufacture the phosphoric acid may have attacked the cadmium sulphide to an undesirable extent.

The layer F provided on the support is dried at a temperature of 70° C. The support together with the dried layer, G, is heated to a temperature of 550° C. in air at atmospheric pressure for half an hour with the formation of a photo-conductive layer H on the support. This duration of the heat-treatment is sufficient to enable the cadmium chloride to be evaporated.

In spraying the mixture on the support, attention should be paid to the fact that a sufficient amount is used to form a continuous layer, which is readily perceived with the eye. After the heat-treatment, a layer having a thickness of from about 100μ to 200μ is obtained.

In this manner, a photocell was made in which a photoconductive layer 2 consisting of activated cadmium sulphide was applied to a glass support 1 having a length of 5 cms. and a width of 3 cms. (FIG. 2). Two electrodes 3 and 4 were provided on the photo-conductive layer 2 by the deposition of aluminum from the vapour state with the use of a mask. The electrodes each had a length of 2 cms. and a width of 1 cm. and they were spaced by a narrow gap ½ mm. wide and 2 cms. long. With the aid of silver paste 5, 6 nickel contact leads 7, 8 were provided on the electrodes 3, 4 respectively. The silver paste consisted of powdered silver dispersed in ethoxylin resin and was hardened at a temperature of 120° C. after the provision of the nickel leads.

After the photoconductive layer had been mechanically removed from the edges of the glass support, the remainder of this layer together with the contacts was embedded in ethoxylin resin (not shown).

The resulting photocell was then tested and the results of the test are given in the following table. The voltage applied across the photocell was 20 v. and the intensity of the illumination used was 1.6 lux. The light was produced by a tungsten lamp (temperature 2,600° C.). In the table, $i_D$ indicates the dark current, $i_L$ the current after illumination and $\tau_{0.1}$ the decay time in seconds after the elapse of which the current strength is reduced on interruption of the exposure to 0.1 part of the value at the illumination used.

TABLE

| Voltage | $i_D$, μA. | $i_L$, μA. | $\tau_{1/10}$, seconds |
|---|---|---|---|
| 20 v | 0.05 | 48 | 0.4 |

The table shows that the photocell has a comparatively high sensitivity and a short decay time on exposure to a comparatively weak illumination.

The invention is not restricted to the sizes and the construction of the electrodes mentioned hereinbefore. The electrodes may be shaped in another form, for example, they may be of a known comb-shape. Further the invention is not restricted to use in photocells. The invention is also suitable for other purposes, particularly those in which photoconductive layers of large size have to be used, for example, in image intensifiers. By the method according to the invention photo-conductive layers several decimetres long and wide may be manufactured which have satisfactory coherence and uniformity and a high photo-sensitivity.

Further, the invention is not restricted to the use of cadmium sulphide, but may also be employed with powwered cadmium selenide or with powders consisting of mixed crystals of cadmium sulphide and cadmium selenide, as the case may be, with added activators.

What is claimed is:

1. A method of manufacturing a photoconductor device comprising a layer of photoconductive material selected from the group consisting of cadmium sulphide, cadmium selenide and mixed crystals thereof, comprising the steps, dispersing said photoconductive material in powdered form in a solution consisting essentially of a minor amount of phosphorus in oxidized form and at least one cadmium halide selected from the group consisting of cadmium chloride, cadmium bromide and cadmium iodide, depositing a portion of said solution onto a support to form a layer, and thereafter heating said deposit to produce the photoconductive material.

2. A method as set forth in claim 1 wherein the powder has a grain size less than 100μ.

3. A method as set forth in claim 1 wherein the powder has a grain size less than 50μ.

4. A method as set forth in claim 1 wherein the powder is first added to the cadmium halide solution, and then the phosphorus is added to the solution.

5. A method of manufacturing a photoconductor device comprising a layer of cadmium chalcogenide photoconductive material selected from the group consisting of cadmium sulphide, cadmium selenide and mixed crystals thereof, comprising the steps, dispersing said photoconductive material in powdered form in a solution consisting essentially of phosphorus in oxidized form and at least one cadmium halide selected from the group consisting of cadmium chloride, cadmium bromide and cadmium iodide, the phosphorus content of said solution lying between 0.05 and 0.5 atomic percent of the cadmium content of the powder, the cadmium halide content of said solution lying between 0.7 and 7 mole percent of the cadmium chalcogenide content of the powder, depositing a portion of said solution onto a support to form a layer, and thereafter removing the solvent and heating said layer for a period of time sufficient for the cadmium halide to evaporate and form a coherent layer.

6. A method as set forth in claim 5 wherein the phosphorus is added in the pentavalent form.

7. A method as set forth in claim 6 wherein the phosphorus is phosphorus pentoxide.

8. A method as set forth in claim 6 wherein the phosphorus is added as phosphoric acid or ammonium phosphate.

9. A method of manufacturing a photo conductor device comprising a layer of activated cadmium chalcogenide photoconductive material selected from the group consisting of cadmium sulphide, cadmium selenide and mixed crystals thereof, comprising the steps, dispersing said activated photoconductive material in powdered form in a solution consisting essentially of phosphorus in oxidized form and at least one cadmium halide selected from the group consisting of cadmium chloride, cadmium bromide and cadmium iodide, the phosphorus content of said solution being between 0.05 and 0.5 atomic percent of the cadmium content of the powder, the cadmium halide content of said solution being between 0.7 and 7 mole percent of the cadmium chalcogenide content of the powder, depositing a portion of said solution onto a support to form a layer, and thereafter removing the solvent and heating said layer in an oxygen-containing atmosphere at a temperature between about 450° and 700° C. for a period of time sufficient for the cadmium halide to evaporate and form a coherent layer.

10. A method as set forth in claim 9 wherein the photoconductive powder contains gallium and copper as the activators.

11. A method as set forth in claim 10 wherein the content of said activators lies between about $5 \times 10^{-3}$ and $5 \times 10^{-2}$ atomic percent of the cadmium content of the powder.

References Cited by the Examiner

UNITED STATES PATENTS

| 2,765,385 | 10/1956 | Thomsen | 117—201 X |
| 3,133,888 | 5/1964 | Oikawa | 252—501 |

FOREIGN PATENTS

| 217,301 | 9/1958 | Australia. |
| 1,055,725 | 4/1959 | Germany. |

ALFRED L. LEAVITT, *Primary Examiner.*

WILLIAM L. JARVIS, *Examiner.*